United States Patent
Wang et al.

(10) Patent No.: US 10,719,252 B2
(45) Date of Patent: Jul. 21, 2020

(54) MANAGING DEDUPLICATION CHARACTERISTICS IN A STORAGE SYSTEM

(71) Applicant: EMC IP Holding Company LLC, Hopkinton, MA (US)

(72) Inventors: Yubing Wang, Southborough, MA (US); Philippe Armangau, Acton, MA (US); Ajay Karri, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 40 days.

(21) Appl. No.: 16/054,477

(22) Filed: Aug. 3, 2018

(65) Prior Publication Data

US 2020/0042219 A1    Feb. 6, 2020

(51) Int. Cl.
  *G06F 3/06*      (2006.01)
  *G06F 17/18*     (2006.01)
  *G06N 20/00*     (2019.01)

(52) U.S. Cl.
  CPC .......... *G06F 3/0641* (2013.01); *G06F 3/0608* (2013.01); *G06F 3/0683* (2013.01); *G06F 17/18* (2013.01); *G06N 20/00* (2019.01)

(58) Field of Classification Search
  CPC ...... G06F 3/0641; G06F 3/067; G06F 3/0608; G06F 3/0683; G06F 17/18; G06F 16/1748; G06F 7/00; G06F 17/30; G06F 3/0688; G06F 12/0253; G06F 12/02; G06F 3/065; G06F 3/061; G06N 20/00
  USPC ......................................................... 711/154
  See application file for complete search history.

(56) References Cited

U.S. PATENT DOCUMENTS

| | | | |
|---|---|---|---|
| 8,775,388 B1* | 7/2014 | Chen ..................... | G06F 16/174 707/692 |
| 2011/0246741 A1* | 10/2011 | Raymond ........... | G06F 16/1752 711/170 |
| 2013/0346720 A1* | 12/2013 | Colgrove .............. | G06F 3/0608 711/165 |
| 2014/0114932 A1* | 4/2014 | Mallaiah ............... | G06F 3/0608 707/692 |
| 2014/0289476 A1* | 9/2014 | Nayak ................. | G06F 12/0873 711/133 |

* cited by examiner

*Primary Examiner* — Mano Padmanabhan
*Assistant Examiner* — Jean C Edouard
(74) *Attorney, Agent, or Firm* — Krishnendu Gupta; Lesley Leonessa

(57) ABSTRACT

A method is used in managing deduplication characteristics in a storage system. Deduplication entries stored in a deduplication cache are categorized into a set of deduplication groups based on a data deduplication probability associated with the deduplication entries. A machine learning system is used to dynamically adjust deduplication characteristics associated with the set of deduplication groups based on an I/O workload associated with the storage system.

16 Claims, 6 Drawing Sheets

MANAGING DEDUPLICATION CHARACTERISTICS IN A STORAGE SYSTEM

BACKGROUND

Technical Field

This application relates to managing deduplication characteristics in a storage system.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system Input/Output (I/O) operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies. The physical devices of a data storage system, such as a data storage array (or "storage array"), may be used to store data for multiple applications.

Data storage systems are arrangements of hardware and software that typically include multiple storage processors coupled to arrays of non-volatile storage devices, such as magnetic disk drives, electronic flash drives, and/or optical drives. The storage processors service I/O operations that arrive from host machines. The received I/O operations specify storage objects that are to be written, read, created, or deleted. The storage processors run software that manages incoming I/O operations and performs various data processing tasks to organize and secure the host data stored on the non-volatile storage devices.

Some data storage systems employ software compression and decompression to improve storage efficiency. For example, software compression involves loading compression instructions into memory and executing the instructions on stored data using one or more processing cores. A result of such software compression is that compressed data requires less storage space than the original, uncompressed data. Conversely, software decompression involves loading decompression instructions into the memory and executing the instructions on the compressed data using one or more of the processing cores, to restore the compressed data to its original, uncompressed form.

Other data storage systems perform compression and decompression in hardware. For example, a data storage system may include specialized hardware for compressing and decompressing data. The specialized hardware may be provided on the storage processor itself, e.g., as a chip, chipset, or sub-assembly, or on a separate circuit board assembly. Unlike software compression, which operates by running executable software instructions on a computer, hardware compression employs one or more ASICs (Application Specific Integrated Circuits), FPGAs (Field Programmable Gate Arrays), RISC (Reduced Instruction Set Computing) processors, and/or other specialized devices in which operations may be hard-coded and performed at high speed.

Data storage systems typically employ data compression and deduplication techniques to store data more efficiently. In a conventional data storage system, a data stream including a plurality of data segments is received, and a data segment identifier (ID) (e.g., hash value) is generated for each received data segment. The data segment ID is compared with other data segment IDs in an ID index (or ID dictionary). The data segment IDs in the ID dictionary correspond to unique (or deduplicated) data segments within a deduplication domain previously stored by the data storage system. If the data segment ID of the received data segment matches one of the data segment IDs in the ID dictionary, then a check is performed to determine whether or not the received data segment is identical to (or a duplicate of) a previously stored data segment that corresponds to the matching data segment ID. If the received data segment is determined to be a duplicate of a previously stored data segment, then metadata about the received data segment is generated and stored by the data storage system, and the received data segment is removed from the data storage system. If the data segment ID of the received data segment does not match any of the data segment IDs in the ID dictionary, then the received data segment is compressed for storage on the data storage system. Such data compression typically involves searching the entire data segment to be compressed (also referred to herein as the "compression domain") to find any data sequences that are repeated within the data segment, and replacing the repeated data sequences with placeholders that are smaller than the data sequences being replaced.

SUMMARY OF THE INVENTION

In accordance with one aspect of the invention is a method is used in managing deduplication characteristics in a storage system. The method categorizes deduplication entries stored in a deduplication cache into a set of deduplication groups based on a data deduplication probability associated with the deduplication entries. The method uses a machine learning system to dynamically adjust deduplication characteristics associated with the set of deduplication groups based on an I/O workload associated with the storage system.

In accordance with another aspect of the invention is a system is used in managing deduplication characteristics in a storage system. The system categorizes deduplication entries stored in a deduplication cache into a set of deduplication groups based on a data deduplication probability associated with the deduplication entries. The system uses a machine learning system to dynamically adjust deduplication characteristics associated with the set of deduplication groups based on an I/O workload associated with the storage system.

In accordance with another aspect of the invention, a computer program product comprising a computer readable medium is encoded with computer executable program code. The code enables execution across one or more processors for managing deduplication characteristics in a storage system. The code categorizes deduplication entries stored in a deduplication cache into a set of deduplication groups based on a data deduplication probability associated with the deduplication entries. The code uses a machine learning system to dynamically adjust deduplication characteristics associated with the set of deduplication groups based on an I/O workload associated with the storage system.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
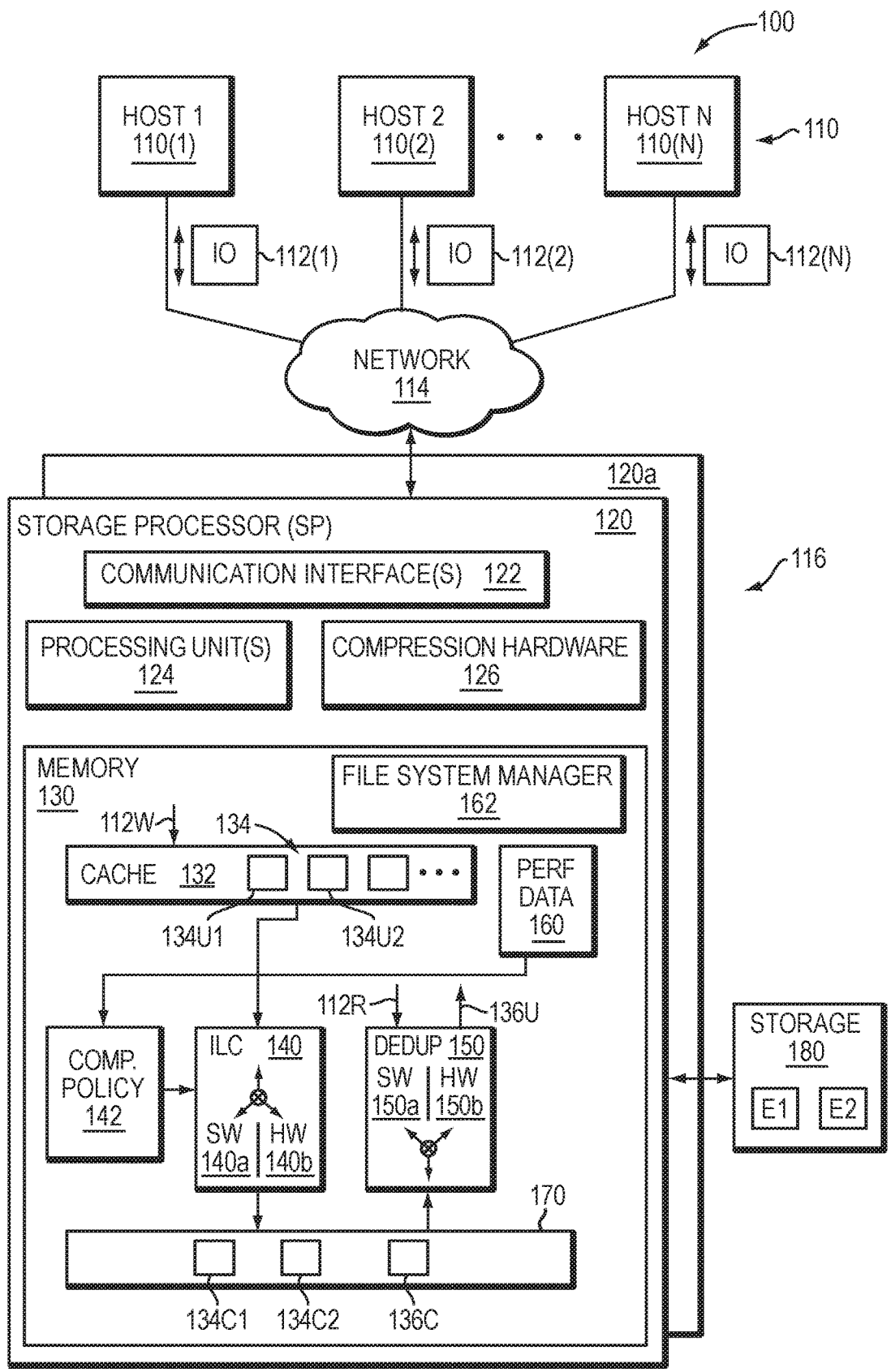
FIG. 1 is a block diagram of an example environment for performing inline deduplication of compressed data, in accordance with an embodiment of the present disclosure.

Described below is a technique for use in managing deduplication characteristics in a storage system, which technique may be used to provide, among other things, categorizing deduplication entries stored in a deduplication cache into a set of deduplication groups based on a data deduplication probability associated with the deduplication entries, and using a machine learning system to dynamically adjust deduplication characteristics associated with the set of deduplication groups based on an I/O workload associated with the storage system.

During a write operation, a deduplication process deduplicates the data by checking if a digest key of the data matches one of the digest keys stored in a cache. The cache contains a file system identifier, a digest key, a block mapping and an extent index. If a match is found, the data is deduplicated in place to matching compressed data. Deduplication is performed using the block mapping structure created for compressed data.

As described herein, in at least one embodiment of the current technique, as digest keys are stored in the cache, a method categorizes the digest keys into a set of deduplication groups based on the probability that the data associated with the digest keys is dedupable. The deduplication groups are categorized so that digest keys associated with data that is more dedupable remain in the cache longer than digest keys associated with data that is less dedupable. Using a machine learning system, the method dynamically adjusts deduplications characteristics associated with the set of deduplication groups based on an I/O workload associated with the storage system.

Conventional technologies do not maximize deduplication by dynamically adjusting how long digest keys remain in a cache. Conventional technologies hard code system parameters, for example, how long the digest keys remain in the cache. Conventional technologies do not generally use memory to store digest keys. Using memory requires using the cache as efficiently as possible. Conventional technologies that hard code how long digest keys remain in the cache do not provide ways to use the cache as efficiently as possible. Conventional technologies do not categorize the digest keys in a cache according to the dedupability of the data associated with the digest keys. Conventional technologies do not use Artificial Intelligence to categorize the digest keys. Conventional technologies do not provide an efficient and cost effective way to tune the categories of the digest keys. Conventional technologies do not provide a way to re-tune the system parameters if the storage system workload and/or I/O pattern changes.

By contrast, in at least some implementations in accordance with the current technique as described herein, a method categorizes deduplication entries stored in a deduplication cache into a set of deduplication groups based on a data deduplication probability associated with the deduplication entries. The method uses a machine learning system to dynamically adjust (i.e., tune) deduplication characteristics associated with the set of deduplication groups based on an I/O workload associated with the storage system.

Thus, in at least one embodiment of the current technique, the goal of the current technique is maximize deduplication by applying artificial intelligence in the form of machine learning to categorize digest keys in a cache according to the dedupability of the data associated with the digest keys, and to dynamically adjust those categorizations as the workload and/or I/O patterns of the storage system changes.

In at least some implementations in accordance with the current technique described herein, the use of managing deduplication characteristics in a storage system technique can provide one or more of the following advantages: maximizing deduplication by dynamically adjusting how long digest keys remain in a cache by categorizing those digest keys, adjusting system parameters automatically according to the workload and I/O pattern of the storage system, providing customers with storage systems that have tunable system parameters without requiring the customer to provide data to tune the system parameters, where the system parameters may be how long the digest keys remain in the cache, and characterizing the workload of the storage system to retain and/or evict digest keys from the cache based on the dedupability of the data associated with the digest keys.

In contrast to conventional technologies, in at least some implementations in accordance with the current technique as described herein, a method categorizes deduplication entries stored in a deduplication cache into a set of deduplication groups based on a data deduplication probability associated with the deduplication entries. The method uses a machine learning system to dynamically adjust deduplication characteristics associated with the set of deduplication groups based on an I/O workload associated with the storage system.

In an example embodiment of the current technique, the method iteratively updates the deduplication characteristics associated with the set of deduplication groups as data is processed for inline deduplication in the storage system, where the set of deduplication groups is updated dynamically.

In an example embodiment of the current technique, when the method iteratively updates the deduplication characteristics associated with the set of deduplication groups as data is processed for inline deduplication in the storage system, the method updates the deduplication characteristics upon processing at least one data entry for inline deduplication.

In an example embodiment of the current technique, each deduplication group is defined by a weighted Gaussian distribution.

In an example embodiment of the current technique, when the method iteratively updates the deduplication characteristics associated with the set of deduplication groups as data is processed for inline deduplication in the storage system, the method dynamically adjusts parameters associated with the weighted Gaussian distribution.

In an example embodiment of the current technique, each deduplication entry in the deduplication cache includes a digest associated with a portion of data and a block mapping metadata associated with the portion of data.

In an example embodiment of the current technique, the deduplication entries are categorized into the set of deduplication groups to maximize the data deduplication in the storage system.

In an example embodiment of the current technique, when the method maximizes data deduplication, the method retains the deduplication entries in the deduplication cache for a period of time based on the data deduplication probability associated with data represented by the deduplication entries, where a subset of the deduplication entries are retained in the deduplication cache longer as the data deduplication probability increases.

In an example embodiment of the current technique, when the method categorizes deduplication entries stored in the deduplication cache into the set of deduplication groups based on the data deduplication probability associated with the deduplication entries, the method determines a deduplication rate for a file system on the storage system based on a deduplication entry associated with the file system and a file system identifier. The method categorizes the deduplication entry into the one of the deduplication groups based on the deduplication rate.

FIG. 1 depicts an example embodiment of a system 100 that may be used in connection with performing the techniques described herein. Here, multiple host computing devices ("hosts") 110, shown as devices 110(1) through 110(N), access a data storage system 116 over a network 114. The data storage system 116 includes a storage processor, or "SP," 120 and storage 180. In one example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or in any other suitable way.

In an example, the data storage system 116 includes multiple SPs, like the SP 120 (e.g., a second SP, 120a). The SPs may be provided as circuit board assemblies, or "blades," that plug into a chassis that encloses and cools the SPs. The chassis may have a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI (Internet Small Computer Systems Interface), NFS (Network File System), SMB (Server Message Block) 3.0, and CIFS (Common Internet File System), for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

As further shown in FIG. 1, the SP 120 includes one or more communication interfaces 122, a set of processing units 124, compression hardware 126, and memory 130. The communication interfaces 122 may be provided, for example, as SCSI target adapters and/or network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs.

The compression hardware 126 includes dedicated hardware, e.g., one or more integrated circuits, chipsets, subassemblies, and the like, for performing data compression and decompression in hardware. The hardware is "dedicated" in that it does not perform general-purpose computing but rather is focused on compression and decompression of data. In some examples, compression hardware 126 takes the form of a separate circuit board, which may be provided as a daughterboard on SP 120 or as an independent assembly that connects to the SP 120 over a backplane, midplane, or set of cables, for example. A non-limiting example of compression hardware 126 includes the Intel® QuickAssist Adapter, which is available from Intel Corporation of Santa Clara, Calif.

The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a cache 132, an inline compression (ILC) engine 140, a deduplication engine 150, and a data object 170. A compression policy 142 provides control input to the ILC engine 140. The deduplication engine 150 optionally performs deduplication by determining if a first allocation unit of data in the storage system matches a second allocation unit of data. When a match is found, the leaf pointer for the first allocation unit is replaced with a deduplication pointer to the leaf pointer of the second allocation unit.

In addition, the memory 130 may also optionally includes an inline decompression engine (not shown) and a decompression policy (not shown), as would be apparent to a person of ordinary skill in the art. Both the compression policy 142 and the decompression policy receive performance data 160 that describes a set of operating conditions in the data storage system 116.

In an example, the data object 170 is a host-accessible data object, such as a LUN, a file system, or a virtual machine disk (e.g., a VVol (Virtual Volume), available from VMWare, Inc. of Palo Alto, Calif. The SP 120 exposes the data object 170 to hosts 110 for reading, writing, and/or other data operations. In one particular, non-limiting example, the SP 120 runs an internal file system and implements the data object 170 within a single file of that file system. In such an example, the SP 120 includes mapping (not shown) to convert read and write requests from hosts 110 (e.g., IO requests 112(1-N)) to corresponding reads and writes to the file in the internal file system.

As further shown in FIG. 1, ILC engine 140 includes a software component (SW) 140a and a hardware component (HW) 140b. The software component 140a includes a compression method, such as an algorithm, which may be implemented using software instructions. Such instructions may be loaded in memory and executed by processing units 124, or some subset thereof, for compressing data directly, i.e., without involvement of the compression hardware 126. In comparison, the hardware component 140b includes software constructs, such as a driver and API (application programmer interface) for communicating with compression hardware 126, e.g., for directing data to be compressed by the compression hardware 126. In some examples, either or both components 140a and 140b support multiple compression algorithms. The compression policy 142 and/or a user may select a compression algorithm best suited for current operating conditions, e.g., by selecting an algorithm that produces a high compression ratio for some data, by selecting an algorithm that executes at high speed for other data, and so forth.

For deduplicating data, the deduplication engine 150 includes a software component (SW) 150a and a hardware component (HW) 150b. The software component 150a includes a deduplication algorithm implemented using software instructions, which may be loaded in memory and executed by any of processing units 124 for deduplicating data in software. The hardware component 150b includes software constructs, such as a driver and API for communicating with optional deduplication hardware (not shown), e.g., for directing data to be deduplicated by the deduplication hardware. Either or both components 150a and 150b may support multiple deduplication algorithms. In some examples, the ILC engine 140 and the deduplication engine 150 are provided together in a single set of software objects, rather than as separate objects, as shown.

In one example operation, hosts 110(1-N) issue IO requests 112(1-N) to the data storage system 116 to perform reads and writes of data object 170. SP 120 receives the IO requests 112(1-N) at communications interface(s) 122 and passes them to memory 130 for further processing. Some IO requests 112(1-N) specify data writes 112W, and others specify data reads 112R, for example. Cache 132 receives write requests 112W and stores data specified thereby in cache elements 134. In a non-limiting example, the cache 132 is arranged as a circular data log, with data elements 134 that are specified in newly-arriving write requests 112W added to a head and with further processing steps pulling data elements 134 from a tail. In an example, the cache 132 is implemented in DRAM (Dynamic Random Access Memory), the contents of which are mirrored between SPs 120 and 120a and persisted using batteries. In an example, SP 120 may acknowledge writes 112W back to originating hosts 110 once the data specified in those writes 112W are stored in the cache 132 and mirrored to a similar cache on SP 120a. It should be appreciated that the data storage system 116 may host multiple data objects, i.e., not only the data object 170, and that the cache 132 may be shared across those data objects.

When the SP 120 is performing writes, the ILC engine 140 selects between the software component 140a and the hardware component 140b based on input from the compression policy 142. For example, the ILC engine 140 is configured to steer incoming write requests 112W either to the software component 140a for performing software compression or to the hardware component 140b for performing hardware compression.

In an example, cache 132 flushes to the respective data objects, e.g., on a periodic basis. For example, cache 132 may flush a given uncompressed element 134U1 to data object 170 via ILC engine 140. In accordance with compression policy 142, ILC engine 140 selectively directs data in element 134U1 to software component 140a or to hardware component 140b. In this example, compression policy 142 selects software component 140a. As a result, software component 140a receives the data of element 134U1 and applies a software compression algorithm to compress the data. The software compression algorithm resides in the memory 130 and is executed on the data of element 134U1 by one or more of the processing units 124. Software component 140a then directs the SP 120 to store the resulting compressed data 134C1 (the compressed version of the data in element 134U1) in the data object 170. Storing the compressed data 134C1 in data object 170 may involve both storing the data itself and storing any metadata structures required to support the data 134C1, such as block pointers, a compression header, and other metadata.

It should be appreciated that this act of storing data 134C1 in data object 170 provides the first storage of such data in the data object 170. For example, there was no previous storage of the data of element 134U1 in the data object 170. Rather, the compression of data in element 134U1 proceeds "inline," in one or more embodiments, because it is conducted in the course of processing the first write of the data to the data object 170.

Continuing to another write operation, cache 132 may proceed to flush a given element 134U2 to data object 170 via ILC engine 140, which, in this case, directs data compression to hardware component 140b, again in accordance with policy 142. As a result, hardware component 140b directs the data in element 134U2 to compression hardware 126, which obtains the data and performs a high-speed hardware compression on the data. Hardware component 140b then directs the SP 120 to store the resulting compressed data 134C2 (the compressed version of the data in element 134U2) in the data object 170. Compression of data in element 134U2 also takes place inline, rather than in the background, as there is no previous storage of data of element 134U2 in the data object 170.

In an example, directing the ILC engine 140 to perform hardware or software compression further entails specifying a particular compression algorithm. The algorithm to be used in each case is based on compression policy 142 and/or specified by a user of the data storage system 116. Further, it should be appreciated that compression policy 142 may operate ILC engine 140 in a pass-through mode, i.e., one in which no compression is performed. Thus, in some examples, compression may be avoided altogether if the SP 120 is too busy to use either hardware or software compression.

In some examples, storage 180 is provided in the form of multiple extents, with two extents E1 and E2 particularly shown. In an example, the data storage system 116 monitors a "data temperature" of each extent, i.e., a frequency of read and/or write operations performed on each extent, and selects compression algorithms based on the data temperature of extents to which writes are directed. For example, if extent E1 is "hot," meaning that it has a high data temperature, and the data storage system 116 receives a write directed to E1, then compression policy 142 may select a compression algorithm that executes at a high speed for compressing the data directed to E1. However, if extent E2 is "cold," meaning that it has a low data temperature, and the data storage system 116 receives a write directed to E2, then compression policy 142 may select a compression algorithm that executes at high compression ratio for compressing data directed to E2.

With the arrangement of FIG. 1, the SP 120 intelligently directs compression and other data reduction tasks to software or to hardware based on operating conditions in the data storage system 116. For example, if the set of processing units 124 are already busy but the compression hardware 126 is not, the compression policy 142 can direct more compression tasks to hardware component 140b. Conversely, if compression hardware 126 is busy but the set of processing units 124 are not, the compression policy 142 can direct more compression tasks to software component 140a. Decompression policy may likewise direct decompression tasks based on operating conditions, at least to the extent that direction to hardware or software is not already dictated by the algorithm used for compression. In this manner, the data storage system 116 is able to perform inline compression using both hardware and software techniques, leveraging the capabilities of both while applying them in proportions that result in best overall performance.

In such an embodiment in which element 120 of FIG. 1 is implemented using one or more data storage systems, each of the data storage systems may include code thereon for performing the techniques as described herein.

Servers or host systems, such as 110(1)-110(N), provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN may be used to refer to the foregoing logically defined devices or volumes.

The data storage system may be a single unitary data storage system, such as single data storage array, including two storage processors or compute processing units. Techniques herein may be more generally used in connection with any one or more data storage systems each including a different number of storage processors than as illustrated herein. The data storage system 116 may be a data storage array, such as a Unity™, a VNX™ or VNXe™ data storage array by Dell EMC of Hopkinton, Mass., including a plurality of data storage devices 116 and at least two storage processors 120a. Additionally, the two storage processors 120a may be used in connection with failover processing when communicating with a management system for the storage system. Client software on the management system may be used in connection with performing data storage system management by issuing commands to the data storage system 116 and/or receiving responses from the data storage system 116 over a connection. In one embodiment, the management system may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

In some arrangements, the data storage system 116 provides block-based storage by storing the data in blocks of logical storage units (LUNs) or volumes and addressing the blocks using logical block addresses (LBAs). In other arrangements, the data storage system 116 provides file-based storage by storing data as files of a file system and locating file data using inode structures. In yet other arrangements, the data storage system 116 stores LUNs and file systems, stores file systems within LUNs, and so on.

As further shown in FIG. 1, the memory 130 includes a file system and a file system manager 162. A file system is implemented as an arrangement of blocks, which are organized in an address space. Each of the blocks has a location in the address space, identified by FSBN (file system block number). Further, such address space in which blocks of a file system are organized may be organized in a logical address space where the file system manager 162 further maps respective logical offsets for respective blocks to physical addresses of respective blocks at specified FSBNs. In some cases, data to be written to a file system are directed to blocks that have already been allocated and mapped by the file system manager 162, such that the data writes prescribe overwrites of existing blocks. In other cases, data to be written to a file system do not yet have any associated physical storage, such that the file system must allocate new blocks to the file system to store the data. Further, for example, FSBN may range from zero to some large number, with each value of FSBN identifying a respective block location. The file system manager 162 performs various processing on a file system, such as allocating blocks, freeing blocks, maintaining counters, and scavenging for free space.

In at least one embodiment of the current technique, an address space of a file system may be provided in multiple ranges, where each range is a contiguous range of FSBNs (File System Block Number) and is configured to store blocks containing file data. In addition, a range includes file system metadata, such as inodes, indirect blocks (IBs), and virtual block maps (VBMs), for example, as discussed further below in conjunction with FIG. 2. As is known, inodes are metadata structures that store information about files and may include pointers to IBs. IBs include pointers that point either to other IBs or to data blocks. IBs may be arranged in multiple layers, forming IB trees, with leaves of the IB trees including block pointers that point to data blocks. Together, the leaf IB's of a file define the file's logical address space, with each block pointer in each leaf IB specifying a logical address into the file. Virtual block maps (VBMs) are structures placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system, where a data block or another VBM is stored. However, it should be appreciated that data and metadata may be organized in other ways, or even randomly, within a file system. The particular arrangement described above herein is intended merely to be illustrative.

Further, in at least one embodiment of the current technique, ranges associated with an address space of a file system may be of any size and of any number. In some examples, the file system manager 162 organizes ranges in a hierarchy. For instance, each range may include a relatively small number of contiguous blocks, such as 16 or 32 blocks, for example, with such ranges provided as leaves of a tree. Looking up the tree, ranges may be further organized in CG (cylinder groups), slices (units of file system provisioning, which may be 256 MB or 1 GB in size, for example), groups of slices, and the entire file system, for example. Although ranges as described above herein apply to the lowest level of the tree, the term "ranges" as used herein may refer to groupings of contiguous blocks at any level.

In at least one embodiment of the technique, hosts 110 (1-N) issue IO requests 112(1-N) to the data storage system 116. The SP 120 receives the IO requests 112(1-N) at the communication interfaces 122 and initiates further processing. Such processing may include, for example, performing read and write operations on a file system, creating new files in the file system, deleting files, and the like. Over time, a file system changes, with new data blocks being allocated and allocated data blocks being freed. In addition, the file system manager 162 also tracks freed storage extents. In an example, storage extents are versions of block-denominated data, which are compressed down to sub-block sizes and packed together in multi-block segments. Further, a file system operation may cause a storage extent in a range to be freed, e.g., in response to a punch-hole or write-split operation. Further, a range may have a relatively large number of freed fragments but may still be a poor candidate for free-space scavenging if it has a relatively small number of allocated blocks. With one or more candidate ranges identified, the file system manager 162 may proceed to perform free-space scavenging on such range or ranges. Such scavenging may include, for example, liberating unused blocks from segments (e.g., after compacting out any unused portions), moving segments from one range to another to create free space, and coalescing free space to support contiguous writes and/or to recycle storage resources by returning such resources to a storage pool. Thus, file system manager 162 may scavenge free space, such as by performing garbage collection, space reclamation, and/or free-space coalescing.

In at least one embodiment, the data storage system 116 may further comprise a space savings accounting module that implements a data reduction monitoring and reporting technique. As discussed above, the exemplary deduplication engine 150 optionally performs deduplication by determining if a first allocation unit of data in the storage system matches a second allocation unit of data by comparing SHA (Secure Hash Algorithm) hash values of the allocation units. For example, when a match is found, the deduplication engine 150 may replace the leaf pointer for the first allocation unit with a deduplication pointer to the leaf pointer of the second allocation unit. One or more space savings counters may be optionally incremented, for example, by the space savings accounting module. The hash values of each (or, alternatively, the top N) original previously processed allocation units may be stored in, for example, a deduplication digest database.

As noted above, in at least one embodiment, the data storage system 116 may maintain a number of space savings counters and metrics to report data reduction space savings. In some embodiments, compression and deduplication data reductions may be reported separately and/or in combination. For example, the data reduction savings attributed to compression can be reported independently of the data reduction attributed to deduplication. In addition, the data reduction savings attributed to deduplication can be reported independently of the data reduction attributed to compression. For example, the data reduction attributed to deduplication may be obtained by determining a difference between (i) a total number of pointers comprised of a sum of a number of leaf pointers and a number of deduplication pointers, and (ii) the number of leaf pointers.

Figure 2:
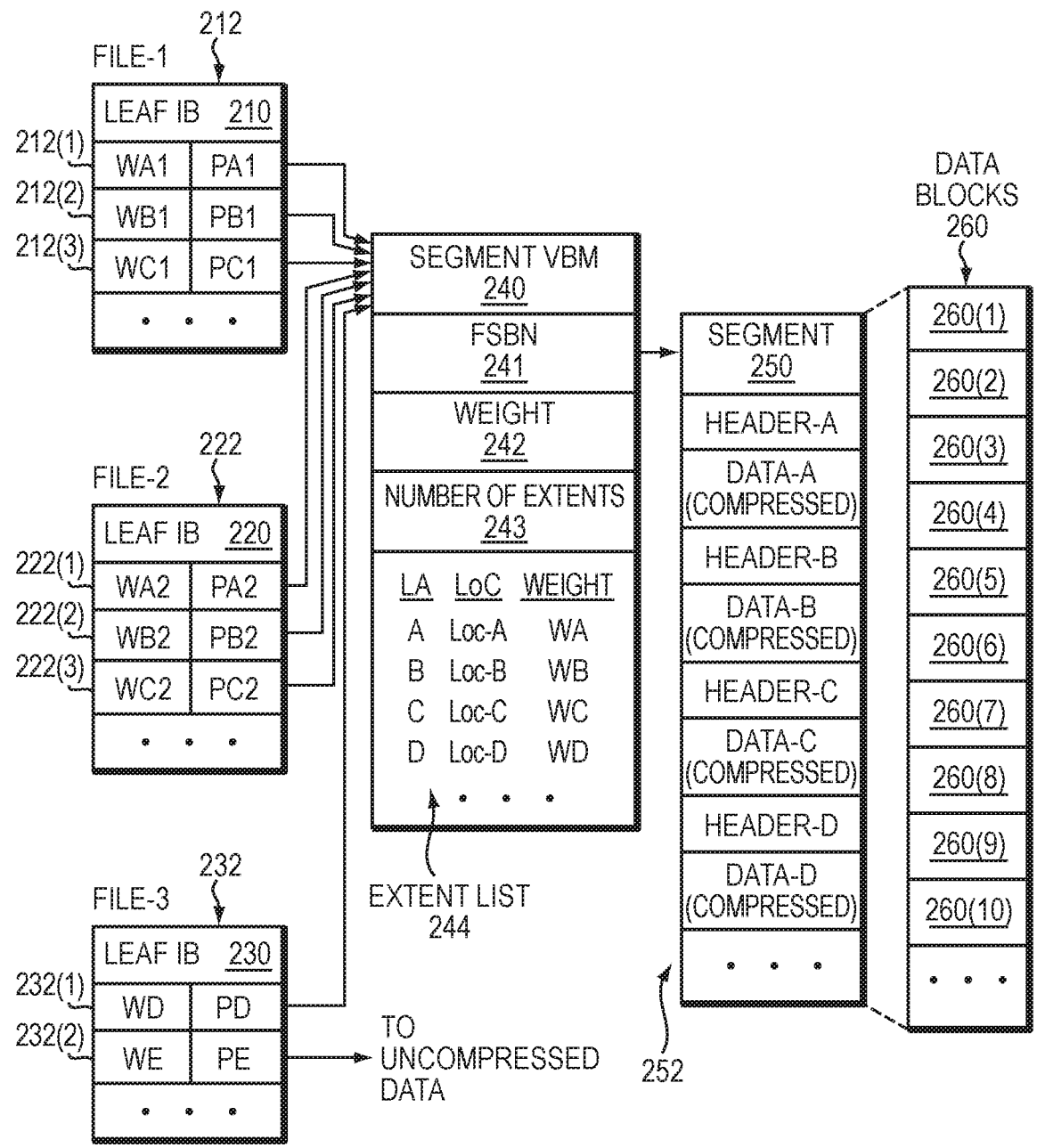
FIG. 2 is a block diagram of example data and metadata structures helpful in performing deduplication in the environment of FIG. 1, in accordance with an embodiment of the present disclosure.

FIG. 2 illustrates a more detailed representation of components that may be included in an embodiment using the techniques herein. As shown in FIG. 2, a segment 250 that stores data of a file system is composed from multiple data blocks 260. Here, exemplary segment 250 is made up of at least ten data blocks 260(1) through 260(10); however, the number of data blocks per segment may vary. In an example, the data blocks 260 are contiguous, meaning that they have consecutive FSBNs in a file system address space for the file system. Although segment 250 is composed from individual data blocks 260, the file system treats the segment 250 as one continuous space. Compressed storage extents 252, i.e., Data-A through Data-D, etc., are packed inside the segment 250. In an example, each of storage extents 252 is initially a block-sized set of data, which has been compressed down to a smaller size. An 8-block segment may store the compressed equivalent of 12 or 16 blocks or more of uncompressed data, for example. The amount of compression depends on the compressibility of the data and the particular compression algorithm used. Different compressed storage extents 252 typically have different sizes. Further, for each storage extent 252 in the segment 250, a corresponding weight is maintained, the weight arranged to indicate whether the respective storage extent 252 is currently part of any file in a file system by indicating whether other block pointers in the file system point to that block pointer.

The segment 250 has an address (e.g., FSBN 241) in the file system, and a segment VBM (Virtual Block Map) 240 points to that address. For example, segment VBM 240 stores a segment pointer 241, which stores the FSBN of the segment 250. By convention, the FSBN of segment 250 may be the FSBN of its first data block, i.e., block 260(1). Although not shown, each block 260(1)-260(10) may have its respective per-block metadata (BMD), which acts as representative metadata for the respective, block 260(1)-260(10), and which includes a backward pointer to the segment VBM 240.

As further shown in FIG. 2, the segment VBM 240 stores information regarding the number of extents 243 in the segment 250 and an extent list 244. The extent list 244 acts as an index into the segment 250, by associating each compressed storage extent 252, identified by logical address (e.g., LA values A through D, etc.), with a corresponding location within the segment 250 (e.g., Location values Loc-A through Loc-D, etc., which indicate physical offsets) and a corresponding weight (e.g., Weight values WA through WD, etc.). The weights provide indications of whether the associated storage extents are currently in use by any files in the file system. For example, a positive number for a weight may indicate that at least one file in the file system references the associated storage extent 252. Conversely, a weight of zero may mean that no file in the file system currently references that storage extent 252. It should be appreciated, however, that various numbering schemes for reference weights may be used, such that positive numbers could easily be replaced with negative numbers and zero could easily be replaced with some different baseline value. The particular numbering scheme described herein is therefore intended to be illustrative rather than limiting.

In an example, the weight (e.g., Weight values WA through WD, etc.) for a storage extent 252 reflects a sum, or "total distributed weight," of the weights of all block pointers in the file system that point to the associated storage extent. In addition, the segment VBM 240 may include an overall weight 242, which reflects a sum of all weights of all block pointers in the file system that point to extents tracked by the segment VBM 240. Thus, in general, the value of overall weight 242 should be equal to the sum of all weights in the extent list 242.

Various block pointers 212, 222, and 232 are shown to the left in FIG. 2. In an example, each block pointer is disposed within a leaf IB (Indirect Block), also referred to herein as a mapping pointer, which performs mapping of logical addresses for a respective file to corresponding physical addresses in the file system. Here, leaf IB 210 is provided for mapping data of a first file (F1) and contains block pointers 212(1) through 212(3). Also, leaf IB 220 is provided for mapping data of a second file (F2) and contains block pointers 222(1) through 222(3). Further, leaf IB 230 is provided for mapping data of a third file (F3) and contains block pointers 232(1) and 232(2). Each of leaf IBs 210, 220, and 230 may include any number of block pointers, such as 1024 block pointers each; however, only a small number are shown for ease of illustration. Although a single leaf IB 210 is shown for file-1, the file-1 may have many leaf IBs, which may be arranged in an IB tree for mapping a large logical address range of the file to corresponding physical addresses in a file system to which the file belongs. A "physical address" is a unique address within a physical address space of the file system.

Each of block pointers 212, 222, and 232 has an associated pointer value and an associated weight. For example, block pointers 212(1) through 212(3) have pointer values PA1 through PC1 and weights WA1 through WC1, respectively, block pointers 222(1) through 222(3) have pointer values PA2 through PC2 and weights WA2 through WC2, respectively, and block pointers 232(1) through 232(2) have pointer values PD through PE and weights WD through WE, respectively.

Regarding files F1 and F2, pointer values PA1 and PA2 point to segment VBM 240 and specify the logical extent for Data-A, e.g., by specifying the FSBN of segment VBM 240 and an offset that indicates an extent position. In a like manner, pointer values PB1 and PB2 point to segment VBM 240 and specify the logical extent for Data-B, and pointer values PC1 and PC2 point to segment VBM 240 and specify the logical extent for Data-C. It can thus be seen that block pointers 212 and 222 share compressed storage extents Data-A, Data-B, and Data-C. For example, files F1 and F2 may be snapshots in the same version set. Regarding file F3, pointer value PD points to Data-D stored in segment 250 and pointer value PE points to Data-E stored outside the segment 250. File F3 does not appear to have a snapshot relationship with either of files F1 or F2. If one assumes that data block sharing for the storage extents 252 is limited to that shown, then, in an example, the following relationships may hold:

$WA = WA1 + WA2;$ $WB = WB1 + WB2;$ $WC = WC1 + WC2;$ $WD = WD;$ and

Weight $242 = \Sigma Wi$ (for $i = a$ through $d$, plus any additional extents 252 tracked by extent list 244).

The detail shown in segment 450 indicates an example layout 252 of data items. In at least one embodiment of the current technique, each compression header is a fixed-size data structure that includes fields for specifying compression parameters, such as compression algorithm, length, CRC (cyclic redundancy check), and flags. In some examples, the header specifies whether the compression was performed in hardware or in software. Further, for instance, Header-A can be found at Loc-A and is immediately followed by compressed Data-A. Likewise, Header-B can be found at Loc-B and is immediately followed by compressed Data-B. Similarly, Header-C can be found at Loc-C and is immediately followed by compressed Data-C.

For performing writes, the ILC engine 140 generates each compression header (Header-A, Header-B, Header-C, etc.) when performing compression on data blocks 260, and directs a file system to store the compression header together with the compressed data. The ILC engine 140 generates different headers for different data, with each header specifying a respective compression algorithm. For performing data reads, a file system looks up the compressed data, e.g., by following a pointer 212, 222, 232 in the leaf IB 210, 220, 230 to the segment VBM 240, which specifies a location within the segment 250. A file system reads a header at the specified location, identifies the compression algorithm that was used to compress the data, and then directs the ILDC engine to decompress the compressed data using the specified algorithm.

In at least one embodiment of the current technique, for example, upon receiving a request to overwrite and/or update data of data block (Data-D) pointed to by block pointer 232(*a*), a determination is made as to whether the data block (Data-D) has been d among any other file. Further, a determination is made as to whether the size of the compressed extent (also referred to herein as "allocation unit") storing contents of Data-D in segment 250 can accommodate the updated data. Based on the determination, the updated data is written in a compressed format to the compressed extent for Data-D in the segment 250 instead of allocating another allocation unit in a new segment.

For additional details regarding the data storage system of FIGS. 1 and 2, see, for example, U.S. patent application Ser.

No. 15/393,331, filed Dec. 29, 2016, entitled "Managing Inline Data Compression in Storage Systems," incorporated by reference herein in its entirety.

Figure 3:
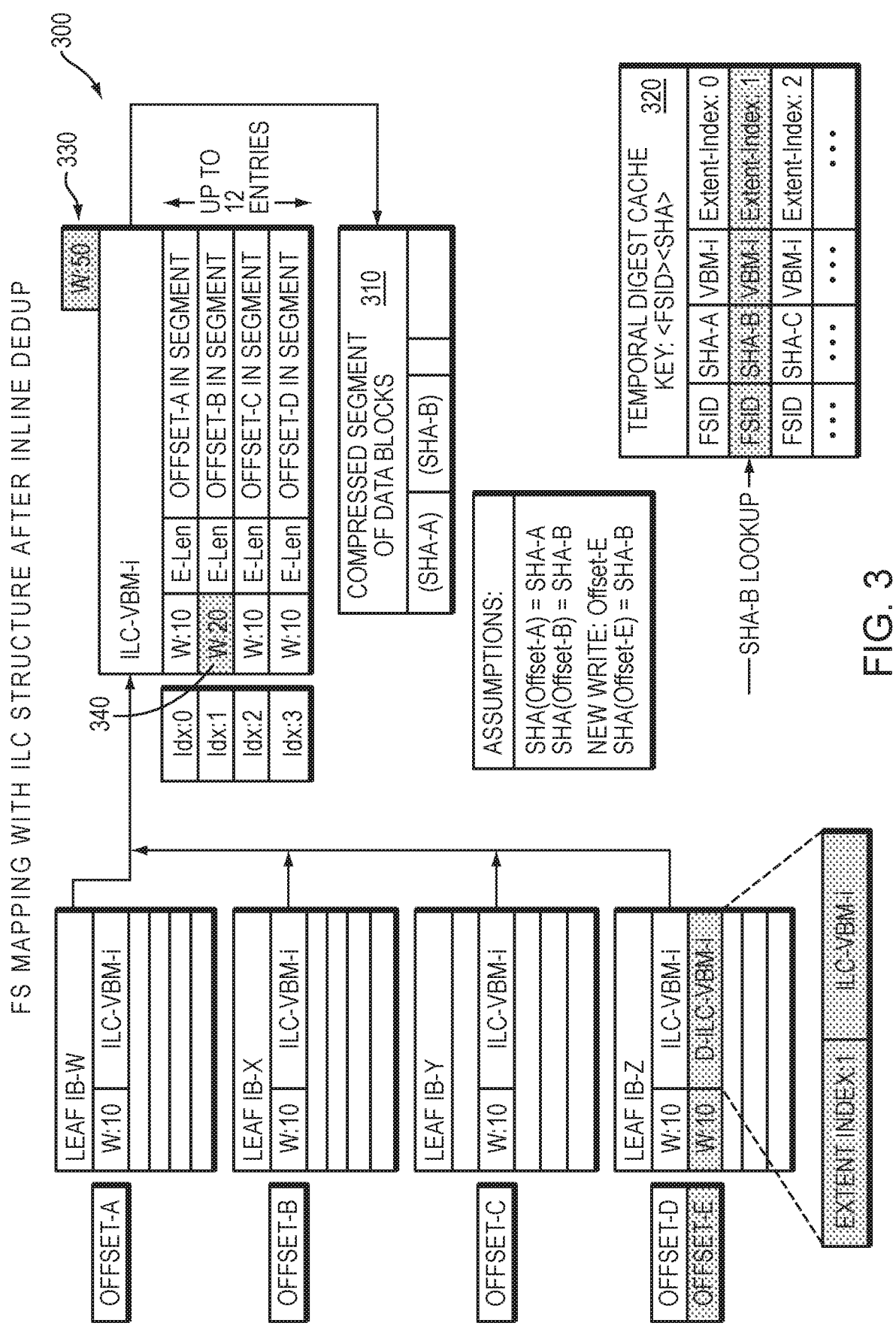
FIG. 3 is a block diagram of example data and metadata structures after performing inline deduplication in the environment of FIG. 1, in accordance with an embodiment of the present disclosure.

FIG. 3 illustrates a similar arrangement 300 as FIG. 2, with certain aspects omitted for ease of illustration, according to an exemplary embodiment of the disclosure. FIG. 3 illustrates a file system mapping of the ILC structure after inline deduplication is performed. In the exemplary arrangement 300 of FIG. 3, the leaf IBs (Indirect Blocks) 210, 220, 230 of FIG. 2 are shown as Leaf IB-W through Leaf IB-Z. In addition, the compressed segment VBM 240 of FIG. 2 is shown as a compressed VBM (ILC-VBM-i). The exemplary compressed segment 250 and data blocks 260(1) through 260(10) of FIG. 2 are shown as compressed segment of data blocks 310, for ease of illustration. The exemplary ILC-VBM-i indicates the offset, weight, and length of each corresponding block or allocation unit in the compressed segment. In addition, the leaf IBs Leaf IB-W through Leaf IB-Z identify ILC-VBM-i, the weight, and offset for the corresponding allocation unit. The Leaf IB-Z also illustrates a block write at Offset-E which has the same SHA as Offset-B, and is deduplicated to extent index:1 in ILC-VBM-i.

The temporal digest cache 320 which, in an example embodiment, is a cache in memory, contains the File System ID (FSID), the digest key (for example, a SHA), a block mapping (in this example scenario VBM-i), and an extent index in the block mapping (ILC-VBM-i).

During the write operation for Offset-E, the method determines whether the data can be deduplicated to matching data residing on the storage system in a compressed format. The method calculates the digest key for the data block, illustrated as SHA(Offset-E). In this example scenario, the digest key for the data matches the digest key for the compressed data at Offset-B in the segment. As illustrated in FIG. 3, SHA(Offset-E)=SHA(Offset-B)=SHA-B. The method maps the data at Offset-E to the compressed data at Offset-B in the segment using a mapping pointer that indicates deduplication, illustrated as D-ILC-VBM-i. Deduplication is indicated by setting a VBM type bit (not shown) to indicate deduplication, and using 4 bits to encode the extent index, in this example scenario, "Extent Index:1". The data represented in FIG. 3 as Offset-E is now mapped to the compressed data at "(SHA-B)" within the compressed segment of data blocks 310.

Figure 4:
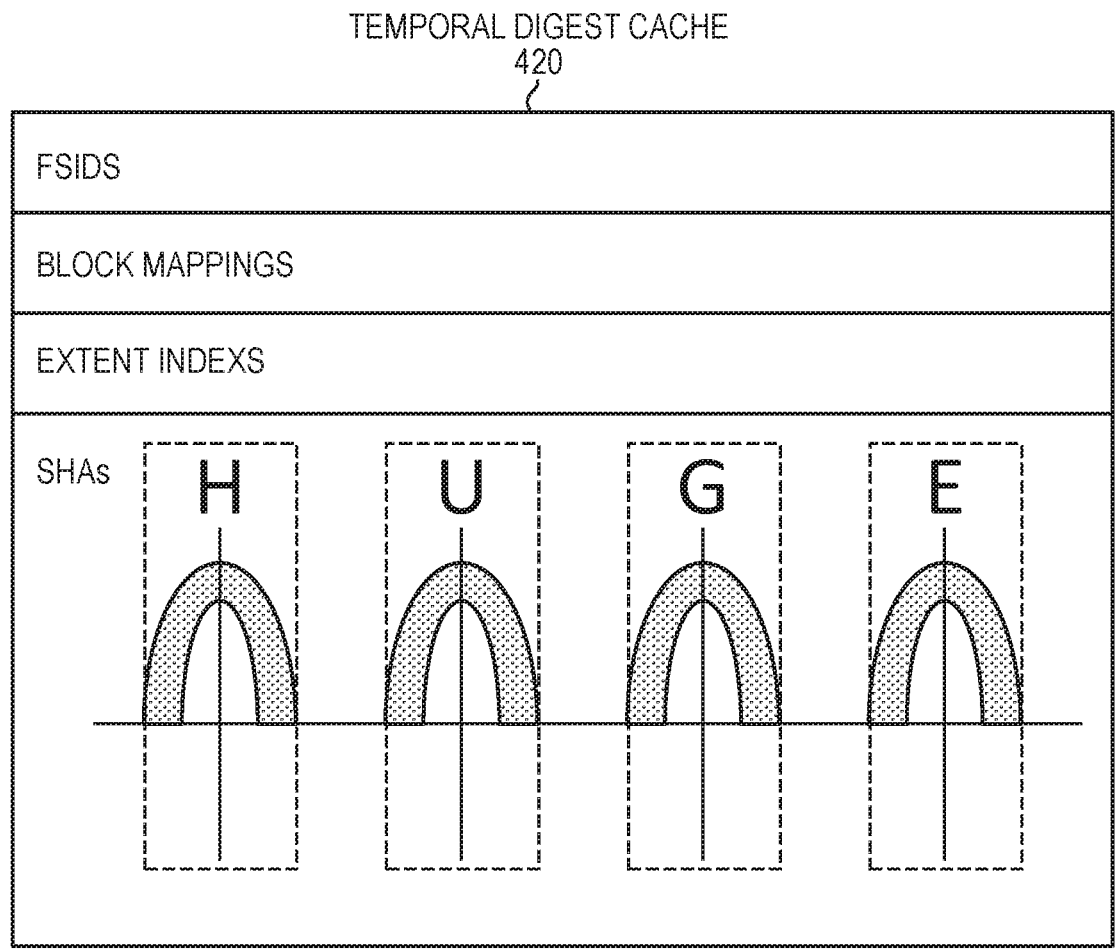
FIG. 4 illustrates an example categorization of deduplication entries into a set of deduplication groups, in accordance with an embodiment of the present disclosure.

The distributed weight for extent-index: 1 (illustrated as idx:1) is incremented from 10 in FIGS. 3 (340) to 20 in FIG. 4 (440). The overall weight (as illustrated as overall weight 242 in FIG. 2) is also incremented from 40 in FIGS. 3 (330) to 50 in FIG. 4 (430).

FIG. 4 illustrates an example categorization of deduplication entries into a set of deduplication groups. As illustrated in FIG. 3, the temporal digest cache 320 contains the File System ID (FSID), the digest key (for example, a SHA), a block mapping (in this example scenario VBM-i), and an extent index in the block mapping (ILC-VBM-i).

As illustrated in FIG. 4, within the temporal digest cache 420, the digest keys are categorized into a set of deduplication groups. In an example embodiment, each distribution group is defined by a weighted Gaussian distribution. For illustration purposes, the deduplication groups are defined as "H", "U", "G", and "E". In this example scenario, the "H" group represents a group of deduplication entries that represent data that is rarely deduplicated. The "U" group represents a group of deduplication entries that represent data where it is unknown if the data is dedupable. The "G" group represents a group of deduplication entries that represent data that has a good probability of being dedupable. The "E" group represents a group of deduplication entries that represent data that has an excellent probability of being dedupable.

In an example embodiment, a machine learning system dynamically adjusts the deduplication characteristics associated with the set of deduplication groups ("H", "U", "G", and "E"). In an example embodiment, the machine learning system is an untrained system that learns by itself how to categorize the deduplication groups, for example, how to classify the deduplication entries by "Least Recently Used" (LRU). In an example embodiment, data, such as a LUN or File System is categorized into a deduplication group based on the amount of deduplication performed over time as compared to the number of blocks allocated. For example, a file system is allocated into the "U" group if the ratio of the number of block allocated vs. LUN size is small. This is because it may be too early in the process for the method to determine how dedupable the data in the file system is.

In an example embodiment, a file system may be promoted or demoted within the set of deduplication groups base on the data workload type. For example, a first file block from a first LUN may enter the storage system, and the digest key associated with that first file block may be assigned to the "G" group. The next 100 file blocks from the first LUN may enter the storage system, and the digest keys associated with those 100 file blocks may be assigned to the "E" group.

In an example embodiment, the deduplication entries are categorized into the set of deduplication groups to maximize the data deduplication within the storage system. Thus, a deduplication entry, such as a digest key, that is associated with data that is more dedupable than other data will be maintained within the temporal digest cache longer than other digest keys associated with less dedupable data. For example, in each of the deduplication groups, the temporal digest cache has 3 levels of LRU, and for each one, the temporal digest cache has its own level of retention. As an example, the levels of retention may be defined as follows:

| Group | Level | Retention Period |
| --- | --- | --- |
| H | 0 | 1 minutes |
|   | 1 | 5 minutes |
|   | 2 | 15 minutes |
| U | 0 | 5 minutes |
|   | 1 | 15 minutes |
|   | 2 | 30 minutes |
| G | 0 | 15 minutes |
|   | 1 | 1 hour |
|   | 2 | 4 hours |
| E | 0 | 1 hour |
|   | 1 | 8 hours |
|   | 2 | 24 hours |

In an example embodiment, if a file system is the only file system generating write into the storage system, the deduplication groups may be populated with deduplication entries only from that file system. The method defines a low water mark/threshold (LWM) per group and per level. The LWM may be used as a criteria to determine when to recycle a deduplication entry. The LWM may be used to define the maximum number of deduplication entries that can be added to the temporal digest cache associated with, for example, a particular file system. To determine which entry to recycle, the method identifies a deduplication group and a Level that has a number of deduplication entries that is greater than the LWM. The LWM may be defined per level and deduplication group just as the retention (described above) is. For example:

LWM=(MAX Number of deduplication entries in Temporal Digest Cache size)/$N$ $N$=Number of LRU (or 12)*$n$ $n$=Deduplication Group Factor(Deduplication Group)+Level Factor(Level)

| Deduplication Group | Group Factor |
|---|---|
| H | 4 |
| U | 3 |
| G | 2 |
| E | 1 |

| Level | Level Factor |
|---|---|
| 0 | 3 |
| 1 | 2 |
| 2 | 1 |

The machine learning system classifies the LRU: The Dynamic Weighting. The method will weight each Group/Level to select which LRU to recycle a deduplication entry. The LRU with the highest weight will be selected first, and then the next highest weight, etc. In an example embodiment, the Weighting phase may be based on the following table:

| Group | Level | Retention Achieved Weight | # Entries > LWM Weight | Weight Factor |
|---|---|---|---|---|
| H | 0 | 0 or 3 | 0 or 1 | 4 |
|   | 1 | 0 or 2 | 0 or 1 | 4 |
|   | 2 | 0 or 1 | 0 or 1 | 4 |
| U | 0 | 0 or 3 | 0 or 1 | 3 |
|   | 1 | 0 or 2 | 0 or 1 | 3 |
|   | 2 | 0 or 1 | 0 or 1 | 3 |
| G | 0 | 0 or 3 | 0 or 1 | 2 |
|   | 1 | 0 or 2 | 0 or 1 | 2 |
|   | 2 | 0 or 1 | 0 or 1 | 2 |
| E | 0 | 0 or 3 | 0 or 1 | 1 |
|   | 1 | 0 or 2 | 0 or 1 | 1 |
|   | 2 | 0 or 1 | 0 or 1 | 1 |

Weighting=(Weight(Retention Achieved)+Weight(# Entries>LWM))*Weight Factor

In an example embodiment, at a regular interval, for example, every ½ second, the temporal digest cache evaluates the weighting of all LRUs and sorts the Weighing obtained in ascending order. That compiled list, or table (better for CPU cache efficiency) is used by temporal digest cache each time an entry needs to be recycle. In an example embodiment, to avoid contention on the same LRU on all new writes, a set of LRUs is be chosen using a Round Robin method.

Figure 5:
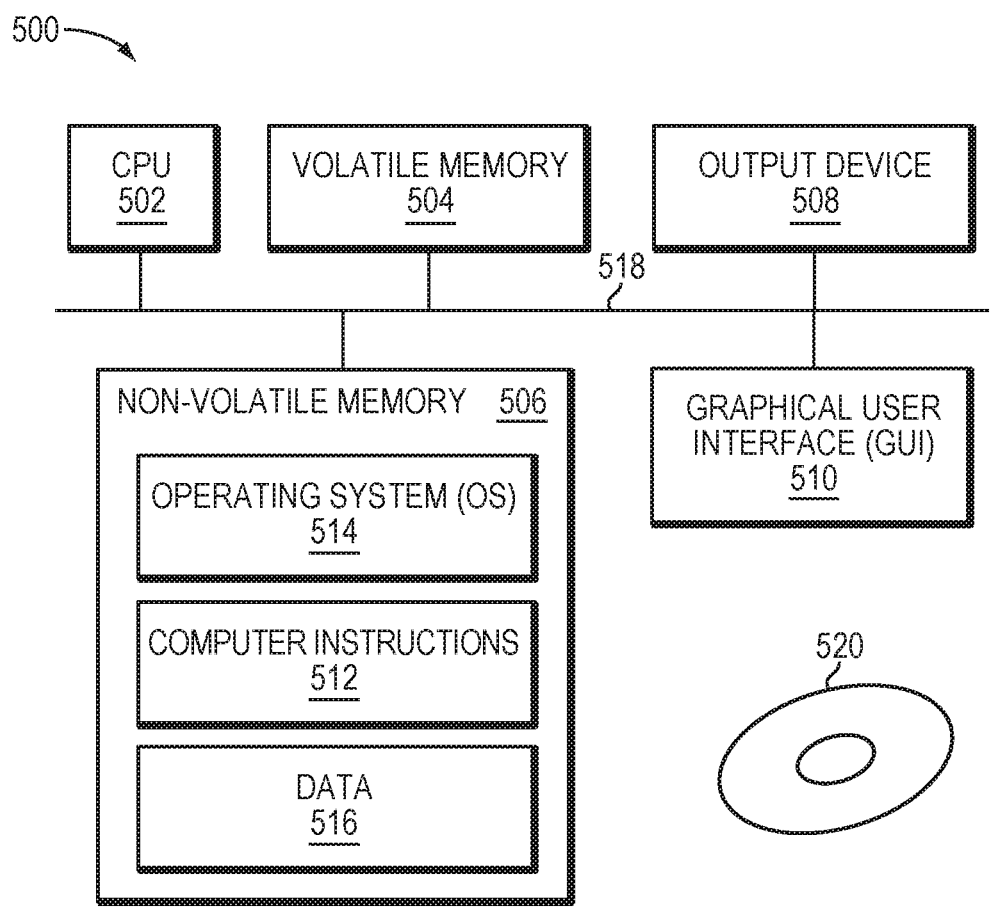
FIG. 5 is a block diagram of a computer, in accordance with an embodiment of the present disclosure.

FIG. 5 illustrates a block diagram of a computer 500 that can perform at least part of the processing described herein, according to one embodiment. The computer 500 may include a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 may be configured to store computer instructions 512, an operating system 514, and data 516. In one example, the computer instructions 512 are executed by the processor 502 out of volatile memory 504. In one embodiment, an article 520 comprises non-transitory computer-readable instructions. In some embodiments, the computer 500 corresponds to a virtual machine (VM). In other embodiments, the computer 500 corresponds to a physical computer.

Figure 6:
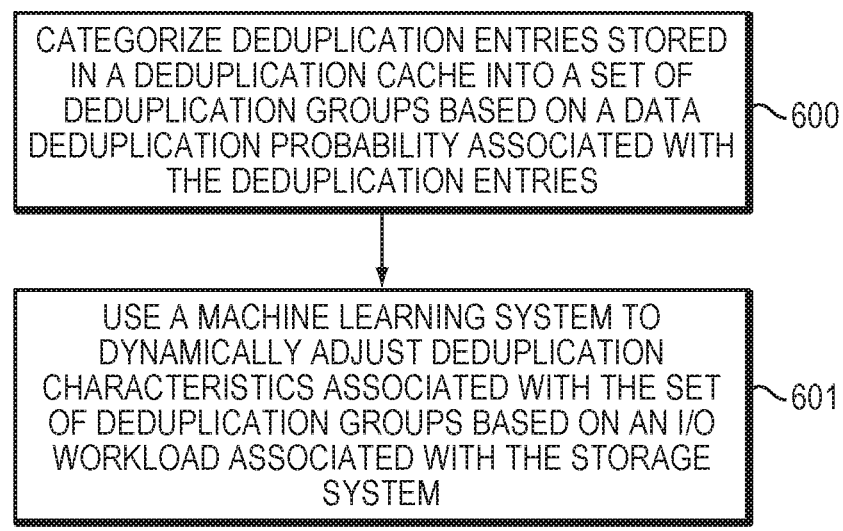
FIG. 6 is a flow diagram illustrating processes that may be used in connection with techniques disclosed herein.

Referring to FIG. 6, shown is a more detailed flow diagram illustrating managing deduplication characteristics in a storage system. With reference also to FIGS. 1-5, the method categorizes deduplication entries stored in a deduplication cache into a set of deduplication groups based on a data deduplication probability associated with the deduplication entries (Step 601). As illustrated in FIG. 4, the deduplication groups are defined as "H", "U", "G", and "E". In an example embodiment, each deduplication entry in the deduplication cache includes a digest associated with a portion of data and a block mapping metadata associated with the portion of data. As illustrated in FIG. 3, each deduplication entry in the deduplication cache, such as the temporal digest cache 320, includes a digest, such as digest key SHA-B, and a block mapping metadata, such as VBM-i, associated with a portion of data. In this example scenario, digest key SHA-B is associated with the portion of data referenced as Offset-B.

In an example embodiment, the deduplication entries are categorized into the set of deduplication groups to maximize the data deduplication in the storage system. To maximize data deduplication, the method retains the deduplication entries in the deduplication cache for a period of time based on the data deduplication probability associated with data represented by the deduplication entries. For example, a subset of the deduplication entries, such as those deduplication entries that are categorized into the "E" group, are retained in the deduplication cache longer as the data deduplication probability increases, versus those deduplication entries that are categorized into the "H" group.

In an example embodiment, the method uses a machine learning system to dynamically adjust deduplication characteristics associated with the set of deduplication groups based on an I/O workload and I/O pattern associated with the storage system (Step 602). In an example embodiment, the machine learning system is an unsupervised machine learning system, meaning there is no training data provided. There may be several reasons for this. Customers who purchase the storage systems may not want to provide the data needed to train the machine learning system. Instead, the data required to train the machine learning system is provided online as the storage system processes the customer's workload. Additionally, by reducing the computation complexity of the machine learning system, the machine learning system may be added to the production coded.

The machine learning system learns as the data workload of the storage system is processed. Different customers who purchase the storage systems may have different workloads and different I/O patterns, making it difficult to determine the deduplication characteristics associated with the set of deduplication groups for each customer storage system. In addition, as the environment/workloads of those customer systems change, there is a need to dynamically adjust the deduplication characteristics.

In an example embodiment, the method iteratively updates the deduplication characteristics associated with the set of deduplication groups as data is processed for inline deduplication in the storage system, where the set of deduplication groups is updated dynamically. In other words, based on the current deduplication characteristics associated with the set of deduplication groups, as data enters the system, the method determines which group the duplication entry (associated with the incoming data) is characterized into (i.e., "H", "U", "G", and "E"). Then the method iteratively updates the deduplication characteristics of the set of deduplication groups in response to that incoming duplication entry. This iterative update may change the deduplication characteristics of the set of deduplication groups. The next duplication entry is processed, and the cycle repeats. In an example embodiment, the method updates the deduplication characteristics upon processing at least one data entry for inline deduplication, for example, each time a deduplication entry or entries, such as a digest key or a batch of digest keys, are stored in the cache.

In an example embodiment, when the method categorizes deduplication entries stored in the deduplication cache into the set of deduplication groups based on the data deduplication probability associated with the deduplication entries, the method determines a deduplication rate for a file system on the storage system based on a deduplication entry associated with the file system (for example, a SHA value) and a file system identifier (for example, a FSID value as illustrated in the temporal digest cache 320 in FIG. 3). The method categorizes the deduplication entry into the one of the deduplication groups based on the deduplication rate as described below.

In an example embodiment, each deduplication group is defined by a weighted Gaussian distribution. In an example embodiment, each deduplication group is modeled as a mixture of weighted Gaussian distribution over deduplication ratio:

$$p(r; \pi, \mu, \sigma) = \sum_{k=1}^{4} \pi_{k,t} N(r_t \mid \mu_{k,t}, \sigma_{k,t})$$

$$N(r_t \mid \mu_{k,t}, \sigma_{k,t}) = \frac{1}{(2\pi)^{1/2} \sigma_{k,t}} e^{-\frac{(r_t - \mu_{k,t})^2}{2\sigma_{k,t}^2}}$$

Where, k=H, U, G, E
$r_t$—Dedup ratio at time t
$\pi_{k,t}$—Probability of data entry assigned to group k
$\mu_{k,t}$—Mean for Gaussian distribution for group k at time t
$\sigma_{k,t}$—Standard deviation for Gaussian distribution for group k at time t In an example embodiment, when the method iteratively updates the deduplication characteristics associated with the set of deduplication groups as data is processed for inline deduplication in the storage system, the method dynamically adjusts parameters associated with the weighted Gaussian distribution. In an example embodiment, the deduplication characteristics are updated each time a new digest key, or batch of digest keys are stored in the cache. The method uses a modified Expectation Maximization (EM) to dynamically adjust weighted Gaussian parameters in real-time. The method initializes the Gaussian parameters as follows: Weight, mean and standard Deviation:

$\pi_{k,t0}$, $\mu_{k,t0}$, $\sigma_{k,t0}$
$N_t=1$

The method generates a random number for the deduplication ratio ($r_t$). In an example embodiment, the random number is between 0 and 100. The method computes the deduplication likelihood for each deduplication group based on the current Gaussian parameters:

$$L_{k,t} = \frac{\pi_{k,t} N(r_t \mid \mu_{k,t}, \sigma_{k,t})}{\sum_{j=1}^{4} \pi_{j,t} N(r_t \mid \mu_{j,t}, \sigma_{j,t})}, \quad k = H, U, G, E$$

$$N(r_t \mid \mu_{k,t}, \sigma_{k,t}) = \frac{1}{(2\pi)^{1/2} \sigma_{k,t}} e^{-\frac{(r_t - \mu_{k,t})^2}{2\sigma_{k,t}^2}}$$

The method categorizes the digest key (or batch of digest keys) as belonging to the deduplication group with the highest deduplication likelihood as computed above. The method then updates the Gaussian parameters for each group based on the deduplication likelihood as follows:

For $k = H, U, G, E$ $S_{k,t} = \pi_{k,t} * N_t$ $N_{t+1} = N_t + 1$ $S_{k,t+1} = S_{k,t} + L_{k,t}$ $\pi_{k,t+1} = \frac{S_{k,t+1}}{N_{t+1}}$ $\mu_{k,t+1} = \frac{\mu_{k,t} * S_{k,t} + L_{k,t} * r_t}{S_{k,t+1}}$ $\sigma_{k,t+1} = \sqrt{\frac{S_{k,t} * (\sigma_{k,t}^2 + \mu_{k,t}^2) + L_{k,t} * r_t^2}{S_{k,t+1}} - \mu_{k,t+1}^2}$ The method then performs the steps of generating a random number for the deduplication ratio, computing the deduplication likelihood for each deduplication group based on the current Gaussian parameters, categorizing the digest key (or batch of digest keys) as belonging to the deduplication group with the highest deduplication likelihood, and updating parameters for each group based on the deduplication likelihood dynamically, as each digest key or batch of digest keys is stored in the cache.

There are several advantages to embodiments disclosed herein. For example, the method maximizes deduplication by dynamically adjusting how long digest keys remain in a cache by categorizing those digest keys. The method adjusts system parameters, such as how long the digest keys remain in the cache, automatically according to the workload and I/O pattern of the storage system. The method provides customers with storage systems that have tunable system parameters without requiring the customer to provide data to tune the system parameters. The method characterizes the workload of the storage system to retain and/or evict digest keys from the cache based on the dedupability of the data associated with the digest keys.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing deduplication characteristics in a storage system, the method comprising:
    categorizing deduplication entries stored in a deduplication cache into a set of deduplication groups based on a data deduplication probability associated with the deduplication entries, wherein each deduplication group is defined by a weighted Gaussian distribution; and
    using a machine learning system to dynamically adjust deduplication characteristics associated with the set of deduplication groups based on an I/O workload associated with the storage system by dynamically adjusting parameters associated with the weighted Gaussian distribution, wherein the adjusting comprises dynamically adjusting the categorizations.

2. The method of claim 1, further comprising:
    iteratively updating the deduplication characteristics associated with the set of deduplication groups as data is processed for inline deduplication in the storage system, wherein the set of deduplication groups is updated dynamically.

3. The method of claim 2, wherein iteratively updating the deduplication characteristics associated with the set of deduplication groups as data is processed for inline deduplication in the storage system comprises:
    updating the deduplication characteristics upon processing of at least one data entry for inline deduplication.

4. The method of claim 1, wherein each deduplication entry in the deduplication cache includes a digest associated with a portion of data and a block mapping metadata associated with the portion of data.

5. The method of claim 4, wherein the deduplication entries are categorized into the set of deduplication groups to maximize the data deduplication in the storage system.

6. The method of claim 5, wherein maximizing data deduplication comprises retaining the deduplication entries in the deduplication cache for a period of time based on the data deduplication probability associated with data represented by the deduplication entries, wherein a subset of the deduplication entries is retained in the deduplication cache longer as the data deduplication probability increases.

7. The method of claim 1, wherein categorizing deduplication entries stored in the deduplication cache into the set of deduplication groups based on the data deduplication probability associated with the deduplication entries comprises:
    determining a deduplication rate for a file system on the storage system based on a deduplication entry associated with the file system and a file system identifier; and
    categorizing the deduplication entry into the one of the deduplication groups based on the deduplication rate.

8. A system of managing deduplication characteristics in a storage system, the system comprising a processor configured to:
    categorize deduplication entries stored in a deduplication cache into a set of deduplication groups based on a data deduplication probability associated with the deduplication entries, wherein each deduplication group is defined by a weighted Gaussian distribution; and
    use a machine learning system to dynamically adjust deduplication characteristics associated with the set of deduplication groups based on an I/O workload associated with the storage system by dynamically adjusting parameters associated with the weighted Gaussian distribution, wherein the adjusting comprises dynamically adjusting the categorizations.

9. The system of claim 8, further configured to:
    iteratively update the deduplication characteristics associated with the set of deduplication groups as data is processed for inline deduplication in the storage system, wherein the set of deduplication groups is updated dynamically.

10. The system of claim 9, wherein the processor configured to iteratively update the deduplication characteristics associated with the set of deduplication groups as data is processed for inline deduplication in the storage system is further configured to:

update the deduplication characteristics upon processing of at least one data entry for inline deduplication.

11. The system of claim 8, wherein each deduplication entry in the deduplication cache includes a digest associated with a portion of data and a block mapping metadata associated with the portion of data.

12. The system of claim 11, wherein the deduplication entries are categorized into the set of deduplication groups to maximize the data deduplication in the storage system.

13. The system of claim 12, wherein the processor configured to maximize data deduplication is further configured to retain the deduplication entries in the deduplication cache for a period of time based on the data deduplication probability associated with data represented by the deduplication entries, wherein a subset of the deduplication entries is retained in the deduplication cache longer as the data deduplication probability increases.

14. The system of claim 8, wherein the processor configured to categorize deduplication entries stored in the deduplication cache into the set of deduplication groups based on the data deduplication probability associated with the deduplication entries is further configured to:
    determine a deduplication rate for a file system on the storage system based on a deduplication entry associated with the file system and a file system identifier; and
    categorize the deduplication entry into the one of the deduplication groups based on the deduplication rate.

15. A computer program product for managing deduplication characteristics in a storage system, the computer program product comprising:
    a computer readable storage medium having computer executable program code embodied therewith, the program code executable by a computer processor to:
        categorize deduplication entries stored in a deduplication cache into a set of deduplication groups based on a data deduplication probability associated with the deduplication entries by dynamically adjusting parameters associated with the weighted Gaussian distribution, wherein each deduplication group is defined by a weighted Gaussian distribution; and use a machine learning system to dynamically adjust deduplication characteristics associated with the set of deduplication groups based on an I/O workload associated with the storage system, wherein the adjusting comprises dynamically adjusting the categorizations.

16. The computer program product of claim 15, the program code further configured to:
    iteratively update the deduplication characteristics associated with the set of deduplication groups as data is processed for inline deduplication in the storage system, wherein the set of deduplication groups is updated dynamically.

* * * * *